United States Patent [19]

Prescott

[11] Patent Number: 4,466,997

[45] Date of Patent: Aug. 21, 1984

[54] METHOD OF MAINTAINING AND REPAIRING PROTECTIVE COATINGS FOR THE HIGH TEMPERATURE ZONES OF ENGINES

[75] Inventor: Roger Prescott, Johnson City, Tenn.

[73] Assignee: Great Lakes Carbon Corporation, New York, N.Y.

[21] Appl. No.: 337,376

[22] Filed: Jan. 6, 1982

Related U.S. Application Data

[63] Continuation-in-part of Ser. No. 192,066, Sep. 29, 1980, abandoned.

[51] Int. Cl.$^3$ ............................................. B32B 35/00
[52] U.S. Cl. ........................................ 427/140; 44/60; 44/76; 427/142; 427/239; 427/331
[58] Field of Search .............. 427/140, 142, 230, 237, 427/239, 333, 343, 387, 344, 248.1, 226, 249, 255, 255.2, 255.3, 255.4, 331, 402, 105; 44/76, 60, 58; 156/94; 264/36, 30; 138/97; 123/198 A, 668, 669

[56] References Cited

U.S. PATENT DOCUMENTS

| | | | |
|---|---|---|---|
| 2,529,496 | 11/1950 | Hughes et al. | 44/76 |
| 2,811,467 | 10/1957 | Hull et al. | 427/344 |
| 2,902,983 | 9/1959 | Patberg | 44/67 |
| 2,939,801 | 6/1960 | McGillis et al. | 427/142 |
| 3,003,857 | 10/1961 | Carls | 44/58 |
| 3,406,044 | 10/1968 | Hams | 427/249 |
| 3,407,090 | 10/1968 | Hertl | 427/255.4 |
| 3,994,697 | 11/1976 | Burke | 44/58 |
| 4,098,923 | 7/1978 | Alberti et al. | 427/255 |

FOREIGN PATENT DOCUMENTS

633239  12/1961  Canada ................................ 427/142

*Primary Examiner*—Sadie L. Childs
*Attorney, Agent, or Firm*—R. Laddie Taylor

[57] ABSTRACT

A method for maintaining and/or repairing a protective coating on the surfaces of at least one component in a high temperature zone of an engine during operation thereof wherein selected additives are employed in the engine's fuel.

5 Claims, No Drawings

4,466,997

METHOD OF MAINTAINING AND REPAIRING PROTECTIVE COATINGS FOR THE HIGH TEMPERATURE ZONES OF ENGINES

This application is a continuation-in-part of application Ser. No. 192,066 filed Sept. 29, 1980, now abandoned.

BACKGROUND OF THE INVENTION

1. Field of the Invention

This invention provides a method for maintaining and/or repairing a protective coating on an article exposed to high temperature atmospheres.

2. Description of the Prior Art

Components used in high temperature environments, such as those encountered in the high temperature zones (e.g., combustion chambers, turbine sections and exhasut ports) of jet engines, rocket motors and the like, often must be protected from destructive reaction with oxygen and/or the products of fuel combustion. This is conventionally accomplished by coating the portion of the component exposed to the high temperature atmosphere with a non-reactive material such as a refractory oxide, carbide or silicate.

Considerable effort is being expended in attempts to increase both the operating temperatures and service life of existing coatings. The principal barriers to improvements in performance of such coatings are loss of thickness resulting from volatilization and cracking and spalling of the coating caused by differences in thermal expansion between the coating and the coated surface.

Damage to the protective coating of a component of an engine, if not immediately corrected, will result in loss of the component, which often causes loss of the engine, and ultimately loss of the vehicle powered by the engine.

U.S. Pat. No. 2,811,467—Hull et al., filed Jan. 21, 1952, generally relates to a method for insulating component parts of an apparatus exposed to high temperature gases resulting from the burning of a fuel, comprising applying a precoat formation on the component parts and introducing into the fuel a substance which fluxes with the precoat formation to form semimolten insulating compounds on the component parts.

While it appears that the process of the Hull et al. patent would tend to somewhat insulate the exposed component parts, a reaction of the substance in the fuel with a precoat material, particularly a fluxing reaction, would not be desirable in the advanced engine systems of today. The high velocity, high shear gas flow to which modern components are exposed would tend to remove at least a portion of a semimolten coating, thereby rendering it inefficient or useless.

SUMMARY OF THE INVENTION

It is an objective of the invention to overcome the inadequacies of the prior art means for maintaining a protective coating on components of engines exposed to destructive, high temperature atmospheres.

It is another objective of the invention to provide means for repairing a damaged protective coating on components of engines exposed to destructive, high temperature atmospheres.

These and other objectives of the invention are achieved by adding selected compounds to the fuel to be used in an engine having a protective coating on the surfaces of at least one component of the engine in its high temperature zone. The selected compounds must be soluble in the fuel, unreactive with the protective coating and, upon exposure to the high temperatures and oxidizing atmosphere of the engine combustion zone, must be capable of being oxidized upon combustion of the fuel, to form compounds which sustain and/or repair the protective coating on the engine component.

Although the discovery is not bound by theory, it appears that the excess of oxygen known to be present during fuel combustion results in an atmosphere in which an aerosol of liquid droplets or a vapor of an oxygen-containing compound, for example oxides or mixed oxides, can be created from appropriate additives. The compound then deposits as a coating on the hot engine components. The concentration of the fuel additive is controlled to attain the desired coating rate.

Non-limiting examples of compounds that are suitable as fuel additives for maintaining and/or repairing conventional coatings by the method of the invention are:

silicon compounds, such as tetraethyl silane, propyltriethoxy silane and tetraphenyl silane;

boron compounds, such as decaborane, o-carborane, trimethylborate and triethylborate;

barium compounds, such as barium crown ether complexes;

magnesium compounds, such as diphenyl magnesium etherate and the magnesium crown ether complexes;

calcium compounds, such as calcium chloride dicyclohexyl crown etherate; and titanium compounds, such as the titanium crown ether complexes.

DETAILED DESCRIPTION OF THE INVENTION

When it is desired to maintain an existing protective coating on the surfaces of at least one component in the high temperature zone of an engine to shield the component from destructive reaction with the constituents in the atmosphere to which it is exposed during engine operation, the method of the invention involves introducing into the engine's fuel an effective amount of a soluble additive of a type required to sustain the protective coating.

In the case where an existing protective coating on the exposed internal surfaces of at least one component of a high temperature zone of an engine is damaged, the coating may be repaired during engine operation by a method involving adding to the engine's fuel an effective amount of a soluble additive of a type required to repair the protective coating.

The phrase "effective amount" as used in the specification and claims is defined as about the least quantity of fuel additive that is sufficient to accomplish the stated purpose. Utilization of a quantity of additive above a sufficient amount to accomplish the stated purpose results in an undesirable build-up of coating material in the engine. The required or effective amount of additive may be determined empirically by one skilled in the art.

DESCRIPTION OF THE PREFERRED EMBODIMENT

The following example will further described the invention. It is understood that this example is provided to illustrate the practice of the invention and is not intended as limiting beyond the limitations imposed by the appended claims.

Carbon-carbon composite components generally prepared by heat-treating a formed mixture of carbon or graphite fibers and phenolic, pitch (from coal tar, petroleum, PVC, etc) or like polymers are well known in the art. Although durable at relatively high temperatures in inert or reducing atmospheres, such composite components begin to fail because of oxidation at the temperatures generated in a jet engine. For this reason, carbon-carbon composite components exposed to such an environment require a protective coating.

A coating of silicon carbide (SiC) has proven successful for protecting carbon-carbon composite engine components at moderately high temperatures. However, at higher operating temperatures and atmospheric conditions found in the high temperature zone of a jet engine, the thickness of the SiC coating is observed to diminish to a point which causes failure of the composite component. This destruction is caused by volatilization of $SiO_2$, which is formed as a thin layer by oxidation of the surface of the SiC layer exposed to the combustion products and excess oxygen. This $SiO_2$ layer protects the underlying SiC coating until the layer is volatilized and a new layer of $SiO_2$ is formed by oxidation of the outermost region of the SiC coating. This is a continuous process which ultimately results in destruction of the SiC coating and the composite component.

To protect an SiC-coated carbon-carbon composite component of a turbine section of a jet engine during operation, an effective amount of a silicon-containing compound soluble in jet fuel, tetraethyl silane, is added to the fuel to maintain the $SiO_2$ layer, thereby protecting the SiC coating of the component. The high temperature atmosphere of the combustion zone of the engine is strongly oxidizing and $SiO_2$ is therefore formed from the tetraethyl silane, and continuously replenishes the volatilized $SiO_2$ on the surface of the SiC coating. The concentration of the additive is adjusted to obtain a low rate of deposition to ensure a replenishing and "self-healing" action.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

I claim:

1. A method for maintaining a protective coating on the exposed surfaces of at least one component in the high temperature zone of a jet engine or rocket motor during operation thereof which comprises introducing into said engine's fuel an effective amount of a soluble additive which does not react with said protective coating and is capable of being oxidized upon combustion of said fuel to form a compound of a type required to sustain said protective coating.

2. A method of repairing a damaged protective coating on the exposed surfaces of at least one component in the high temperature zone of a jet engine or rocket motor during operation thereof which comprises introducing into said engine's fuel an effective amount of a soluble additive which does not react with said protective coating and is capable of being oxidized upon combustion of said fuel to form a compound of a type required to repair said protective coating.

3. A method according to claims 1 or 2 wherein at least one component in the high temperature zone comprises a carbon-carbon composite component coated with silicon carbide and the addtive to the engine's fuel is a silicon-containing compound capable of being oxidized to $SiO_2$ when the fuel is combusted.

4. The method of claim 3 wherein the silicon-containing compound is tetraethyl silane.

5. A method for maintaining a protective coating of SiC on the surfaces of a carbon-carbon composite component of a turbine section of a jet engine during operation thereof which comprises introducing into said engine's fuel an amount of tetraethyl silane sufficient to sustain said protective coating during combustion of said fuel.

* * * * *